US007936471B2

(12) United States Patent
Aoki

(10) Patent No.: US 7,936,471 B2
(45) Date of Patent: May 3, 2011

(54) IMAGE FORMATION APPARATUS AND IMAGE FORMATION SYSTEM FOR EXECUTING A CHARGING PROCEDURE

(75) Inventor: Kazuma Aoki, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1243 days.

(21) Appl. No.: 11/318,599

(22) Filed: Dec. 28, 2005

(65) Prior Publication Data

US 2006/0139688 A1 Jun. 29, 2006

(30) Foreign Application Priority Data

Dec. 28, 2004 (JP) ................................ 2004-381925

(51) Int. Cl.
*G06F 3/12* (2006.01)

(52) U.S. Cl. ................................................ 358/1.15

(58) Field of Classification Search ................. 358/1.15, 358/1.13, 1.1, 1.12, 1.9
See application file for complete search history.

(56) References Cited

U.S. PATENT DOCUMENTS

| | | | | |
|---|---|---|---|---|
| 6,064,838 | A | 5/2000 | Maruta et al. | |
| 6,549,947 | B1 * | 4/2003 | Suzuki | 709/229 |
| 7,009,728 | B1 * | 3/2006 | Hara et al. | 358/1.16 |
| 2002/0073229 | A1 * | 6/2002 | Hayashi | 709/237 |
| 2003/0147096 | A1 * | 8/2003 | Tsue et al. | 358/1.15 |
| 2003/0151768 | A1 | 8/2003 | Iida | |
| 2003/0174356 | A1 * | 9/2003 | Cherry et al. | 358/1.15 |
| 2004/0186801 | A1 * | 9/2004 | Morita | 705/32 |
| 2004/0190014 | A1 * | 9/2004 | Ferlitsch | 358/1.5 |

FOREIGN PATENT DOCUMENTS

| | | | |
|---|---|---|---|
| JP | 2001-22671 | A | 1/2001 |
| JP | 2001-195224 | A | 7/2001 |
| JP | 2003-22173 | A | 1/2003 |
| JP | 2003-228474 | | 8/2003 |
| JP | 2004-38477 | A | 2/2004 |

OTHER PUBLICATIONS

JP Office Action dtd Aug. 5, 2008, JP Appln. 2004-381925.
EP Office Action dtd Jan. 18, 2011, EP Appln. 05258084.2.

* cited by examiner

*Primary Examiner* — Benny Q Tieu
*Assistant Examiner* — Jeremiah A Bryar
(74) *Attorney, Agent, or Firm* — Banner & Witcoff, Ltd.

(57) ABSTRACT

An image formation apparatus is configured to communicate with a server apparatus. The server apparatus transmits image data to the image formation apparatus, and executes a charging procedure to determine an amount of money to be charged. The image formation apparatus includes an image data receiving unit configured to receive image data, an image output unit configured to output images in accordance with the image data, a display unit, an input unit configured to receive an input command, and an output control unit configured to control the image output unit in accordance with the input command.

15 Claims, 11 Drawing Sheets

(CHARGE INFO. STORAGE 13b)

| USER ID | PAYMENT METHOD | ATTRIBUTION | UNSETTLED CHARGE INFORMATION | LOCK INFO. | EFFECTIVENESS INFO. |
|---|---|---|---|---|---|
| user 01 | CREDIT CARD | (CARD NUMBER etc.) | $****** | TRUE | TRUE |
| user 02 | PREPAID CARD | (CARD NUMBER etc.) | $****** | FALSE | TRUE |
| user 03 | DEBIT CARD | (CARD NUMBER etc.) | $****** | FALSE | TRUE |
| ... | ... | ... | ... | ... | ... |

CHARGE INFO.

FIG.3A (SESSION MANAGEMENT INFO. STORAGE 13c)

| SESSION ID | USER ID | TRANSMISSION MANAGEMENT INFO. ADDRESS | PROVIDING SERVICE |
|---|---|---|---|
| ss 01 | user 01 | ***** | service A |
| ss 02 | user 02 | ***** | service B |
| ss 03 | user 03 | ***** | service A |
| ••• | ••• | ••• | ••• |

FIG.3B (TRANSMISSION MANAGEMENT INFO. STORAGE 13d)

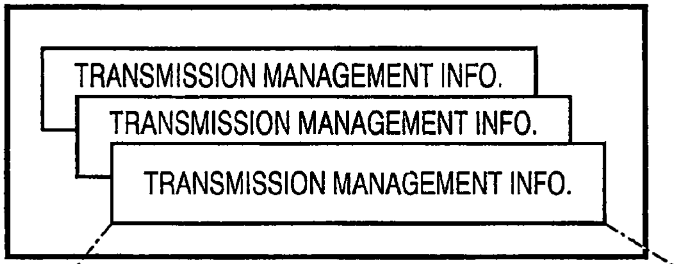

| SERIAL No. | PROVIDING FILE NAME | ATTRIBUTION INFO. | CHARGE SCHEDULE INFO. |
|---|---|---|---|
| 001 | ***** | (FILE GENERATION DATE/TIME) | $ x1 |
| 002 | ***** | (FILE GENERATION DATE/TIME) | $ x2 |
| 003 | ***** | (FILE GENERATION DATE/TIME) | $ x3 |
| ••• | ••• | ••• | ••• |

TRANSMISSION UNIT INFO (TRANSMISSION MANAGEMENT INFO.)

(RECEPTION MANAGEMENT INFO.)

| RECEPTION # | PRINT DATA NAME | ATTRIBUTION INFO. | CHARGE SCHEDULE INFO. |
|---|---|---|---|
| 001 | ***** | (FILE GENERATION DATE/TIME) | $ x1 |
| 002 | ***** | (FILE GENERATION DATE/TIME) | $ x2 |
| 003 | ***** | (FILE GENERATION DATE/TIME) | $ x3 |
| ... | ... | ... | ... |

RECEPTION UNIT INFO (SELECTION INFO.)

| |
|---|
| TOP SELECTION NUMBER |
| END SELECTION NUMBER |
| SELECTION AMOUNT OF MONEY |

IMAGE FORMATION APPARATUS AND IMAGE FORMATION SYSTEM FOR EXECUTING A CHARGING PROCEDURE

CROSS-REFERENCE TO RELATED APPLICATIONS

This application claims priority from Japanese Patent Application No. 2004-381925, filed on Dec. 28, 2004, the entire subject matter of which is incorporated herein by reference.

TECHNICAL FIELD

Aspects of the invention relate to an image formation system including a server device and an image formation device which can communicate with the server device. In particular, aspects of the invention relate to the image formation system in which the server transmits image data to the image formation device, and when the image formation device outputs an image based on the transmitted image data, the server device executes a charging procedure that determines an amount of money in accordance with an output amount of the image.

BACKGROUND OF THE INVENTION

Conventionally, as an image formation device that receives image data through a network and outputs an image (e.g., print an image on a sheet-type recording medium), a printer, a digital copier and the like have been known. Further, a known image formation system estimates an output cost when an image is printed by the image formation device and compares the estimated value with an available cost to determine whether the image is to be output. An example of such an image formation system is disclosed in Japanese Patent Provisional Publication No. P2001-195224A (hereinafter, referred to as "the '224 publication"), teachings of which are incorporated herein by reference.

In the image formation system disclosed in the '224 publication, if the estimated value is less than the remaining amount of money on the prepaid card, the system allows the output of the image, and executes the charging procedure in which the output cost is subtracted from the remaining amount of money on the prepaid card. If the estimated value exceeds the remaining amount of money on the prepaid card, the system inhibits output of the image.

It should be noted that the charging procedure in this specification includes information processing necessary for determining a price for a service to a user. A payment method for such a price includes settlement using electronic money or a credit card, a prepaid card, and the like which has an effect equivalent to cash payment.

In the conventional image formation system as in the '224 publication, output of the image is controlled such that the image formation device outputs an entire image based on the image data received from an external device (i.e., server device) and the estimated cost and the available output cost (e.g., the remaining amount of money on the prepaid card). Therefore, according to the conventional image formation system, it is difficult to control the system so that the image based on image data corresponding to only a predetermined (desired) amount of money is output by the image formation device.

According to the image formation system configured as above, for example, the following problem arises.

If, for example, the image formation system is for printing out images based on data (e.g., news data) provided by an information source service proprietor, the user of the service may receive unnecessary data (e.g., news data in which the user is not interested). In such a case, according to the conventional system, although the user does not want to, it is impossible to stop printing the news data. In such a case, unnecessary charges for the unnecessary new data are imposed on the user. Further, according to the conventional image formation system, it is impossible for the user to set an allowable amount of money depending on contents/importance of provided information (e.g., in the case of news information, currently occurring accidents/phenomena may be more important than others), so that the user can obtain necessary amount of information.

SUMMARY

Aspects of the invention provide an image formation system configured such that the charging process is executed depending on the output amount of information, and the user can obtain a desired amount of images in every image output operation.

BRIEF DESCRIPTION OF THE ACCOMPANYING DRAWINGS

FIG. 3A shows a configuration of a session management information storage unit according to at least one aspect of the invention.

FIG. 3B shows a configuration of a transmission management information storage unit according to at least one aspect of the invention.

DETAILED DESCRIPTION

General Overview

Figures 1, 2:
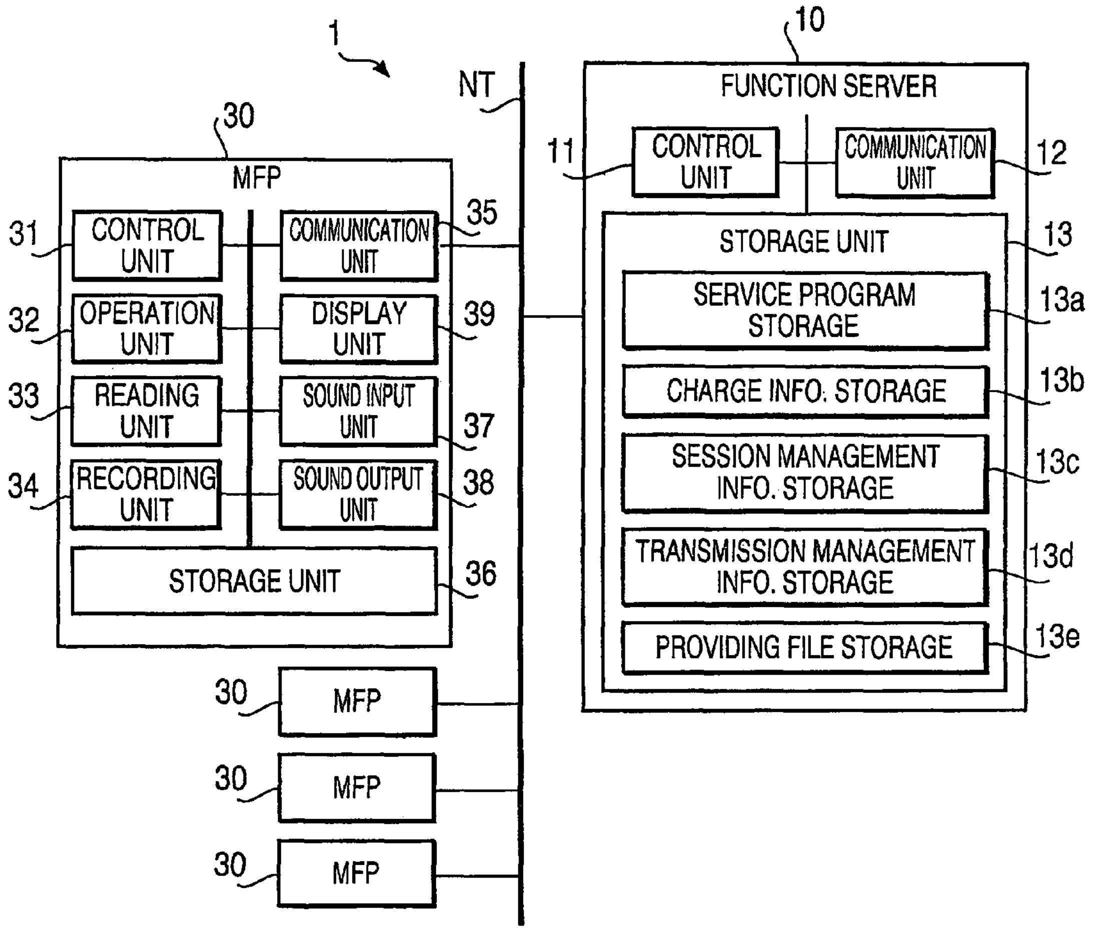
FIG. 1 is a block diagram showing an electrical configuration of a communication system according to aspects of the invention.
FIG. 2 illustrates an information structure of a charge information storage unit of a function server according to at least one aspect of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to aspects of the invention, there is provided an image formation apparatus configured to communicate with a server apparatus, the server apparatus transmitting image data to the image formation apparatus, and executing a charging procedure to determine an amount of money to be charged in accordance with an amount of images to be formed and output. The image formation apparatus includes an image data receiving unit configured to receive image data transmitted from the server apparatus, an image output unit configured to output images in accordance with the received image data, a display unit configured to display an amount of money to be charged if the image output unit outputs the images based on the received image data b, an input unit configured to receive an input command, and an output control unit configured to control the image output unit in accordance with the input command.

The image formation apparatus may further include a charge command signal transmitting unit configured to transmit a charge command signal to the server apparatus when an image is output, the charge command signal causing the server apparatus to execute the charging procedure.

The image output unit outputs an allowed amount of images in response to receiving an allowing signal from the server apparatus when the charging procedure determines the amount of money to be charged.

The image data receiving unit may be configured to receive the charge schedule information representing an amount of money to be charged on a predetermined unit basis together with the image data on the predetermined unit basis from the server apparatus, and the display unit may display a total amount of money indicated by the charge schedule information for each of the image data received on the predetermined unit basis from the server apparatus together with the image data on the predetermined unit basis.

The image output unit may be configured to print an image based on the image data, and the image predetermined unit basis is a page basis.

The image data receiving unit may be configured to store the image data received from the server apparatus in a storage unit, and the image output unit may be configured to output images based on the image data stored in the storage unit in the order the image data is received when the input command is received.

The image output unit and the image data receiving unit may be configured to operate in parallel.

The output control unit may control the image output unit to output images corresponding to the amount of money r displayed by the display unit when the input command is received, the output control unit controlling an output amount by stopping the output of images when the image output unit has output an amount of images corresponding to the amount of money.

The image formation apparatus may include a charge-allowed information storage configured to store charge-allowed information representing the amount of money which is allowed to be charged, wherein the input unit may be configured to receive the charge-allowed information. In response to the input command, the output control unit may cause the image output unit to output images corresponding to the amount of money indicated by the charge-allowed information stored in the charge-allowed information storage. Further, when the image output unit has output the images corresponding to the amount of money indicated by the charge-allowed information, the output control unit may cause the image output unit to stop outputting the images.

The display unit may display information representing the amount of money to be charged if images corresponding to the image data that have been received by the image data receiving unit would be output by the image output unit.

The input unit may be configured to receive a stop transmission command. Further the output control unit may be configured to instruct the server apparatus to stop transmitting the image data in accordance with the stop transmission command.

According to aspects of the invention, there is provided an image formation system, including an image formation apparatus configured to output images in accordance with image data input externally, and a server apparatus. The server apparatus includes an image data transmitting unit configured to transmit image data to the image formation apparatus, and a charge processing unit configured to execute a charging procedure to determine an amount of money to be charged in accordance with an amount of images formed and output by the image formation apparatus. Further, the image formation apparatus may include an image data receiving unit configured to receive the image data transmitted from the server apparatus, an image output unit configured to output images in accordance with the image data received by the image data receiving unit, a display unit configured to display an amount of money to be charged if the image output unit outputs the images based on the image data received by the image data receiving unit, an input unit which can be configured to receive an input command, and an output control unit configured to control an amount of images to be output by the image output unit in accordance with the input command.

According to aspects of the invention, there is provided a computer program product comprising computer readable instructions that cause a computer system to function as an image formation apparatus which is configured to communicate with a server apparatus, the server apparatus transmitting unit image data to the image formation apparatus, and executing a charging procedure to determine an amount of money amount to be charged in accordance with an amount of images to be formed and output by the image formation apparatus. The computer readable instructions may include the steps of receiving image data transmitted from the server apparatus, outputting images in accordance with the received image data, displaying an amount of money to be charged if images based on the received image data are output, receiving an input command and controlling an amount of images to be output in accordance with the input command.

The computer readable instructions may further including the step of storing the image data received from the server apparatus in, and wherein the step of outputting the images includes outputting the images based on the stored image data in the order the image data is received when the input command is received.

The steps of outputting the images and receiving the image data may be configured to be performed in parallel.

The step of controlling the amount of images to be output includes causing the step of outputting to output images corresponding to the amount of money displayed when the input command is received, and causing the step of outputting to stop outputting the images when the amount of images corresponding to the amount of money has been output.

The computer readable instructions may further include the steps of receiving charge-allowed information and storing the charge-allowed information representing the amount of money which is allowed to be charged. Also, the step of controlling may cause the step of outputting to output images corresponding to the amount of money indicated by the charge-allowed information, and causes the step of outputting to stop outputting the images when the images corresponding to the amount of money indicated by the charge-allowed information have been output.

The step of displaying may display information representing the amount of money to be charged if images corresponding to the image data that have been received would be output in the step of outputting.

Further, the computer readable instructions may include the steps of receiving a stop transmission command, and instructing the server apparatus to stop transmitting the image data in accordance with the stop transmission command.

Illustrative Aspects

Now, referring to the accompanying drawings, a communication system according to illustrative aspects of the invention will be described.

FIG. 1 is a block diagram showing a configuration of a communication system 1 according to illustrative aspects of the invention.

The communication system 1 includes a function server 10 configured to provide various services, and a plurality of MFPs (Multi Function Peripherals) 30. The function server 10 and the MFPs 30 are interconnected through a network NT (e.g., the Internet) such that bidirectional communication can be performed.

The MFP 30 according to this illustrative embodiment has functions of a telephone (voice communication), scanner, printer, copier and the like. For example, the MFP 30 receives print data transmitted from the function server 10 and prints an image, based on the received print data, on a sheet-type recording medium (e.g., recording paper).

The function server 10 executes, in response to a request issued by any one of the MFPs 30, a service providing procedure (see FIG. 5) to provide a service to the MFP 30 that issued the request. Specifically, for example, the function server 10 may retrieve news data or the like from a predetermined database (not shown) which is stored in a source file storage unit 13*e* as page-based source files. When the function server 10 receives a request for such files from the MFP 30, it converts the source file into print data and transmits the same to the MFP 30 that issued the request.

The function server 10 includes a control unit 11, a communication unit 12 and a storage unit 13. The control unit 11 includes a CPU (Central Processing Unit), a ROM (Read Only Memory) and a RAM (Random Access Memory), and executes an overall control of each component of the function server 10. The communication unit 12 transmits/receives data through a network NT. The communication unit 12 performs electrical procedures for transmitting/receiving data through the network NT. The storage unit 13 includes an HDD (Hard Disk Drive) or the like and is configured to store various pieces of data.

Specifically, the storage unit 13 may include a service program storage 13*a* that stores programs to be executed by the CPU of the control unit 11 to perform a transmission management information updating procedure, a service providing procedure, and a charging information updating procedure; charging information storage 13*b* that stores charging information for each user ID that is pre-registered identifying information of the respective user; a session management information storage 13*c* that stores session management information for each session ID that is identifying information of a unit of a service provided by the service programs; a transmission management information storage 13*d* that stores transmission management information of each user ID; and source file storage 13*e* that stores the above-described source files.

FIG. 2 shows an illustrative configuration of the charge information storage 13*b*. The charge information storage 13*b* contains user IDs, information indicating a payment method, payment attribution information indicating information necessary for payment (settlement), unsettled amount of money information, and charging information including lock information and effectiveness information, for each user ID.

The charging information is generated when a user is registered with the service and a registration procedure (not shown) is executed by the control unit 11. The information indicating the payment method includes code information indicative of each of "credit card settlement", "prepaid card settlement", and "debit card (or electronic money) settlement". The payment attribution data includes information necessary for the settlement, which includes "credit card number and effective date" for the credit card, "prepaid card number and remaining money information" for the prepaid card, and "debit card number and password (code number)" for the debit card.

The unsettled amount of money information indicates the unsettled amount of money, which is set to zero when the user is registered and updated in the charge information updating procedure, which will be described later. The lock information is for provided for exclusion control when the charge information is edited. The value of the lock information is "TRUE" or "FALSE". That is, when the value of the lock information is "TRUE", editing of the charging information by any task other than one that has updated the lock information is inhibited.

The value of the effectiveness information is "TRUE" or "FALSE". When the value of the effectiveness information is "TRUE", the settlement based on the payment attribution data is enabled, while when the value is "FALSE", the settlement based on the payment attribution is disabled. The effectiveness information is updated in a clerical operation by the service proprietor The value "FALSE" is set when, for example, the card was ineffective in the previous settlement, the remaining amount of money was too low, and the like.

Next, the configuration of the session management information storage 13*c* will be described. FIGS. 3A and 3B show the configuration of the session management information storage 13*c*. As shown in FIGS. 3A and 3B, the session management information storage 13*c* includes session management information including session IDs, user IDs, transmission management information address, and providing service information, for each session ID.

The session management information is generated together with the charging information in the registration procedure (not shown) when the user is registered. Specifically, the session ID is generated as null (no data) information, and then, at every reception of a service, the session ID is updated in the service providing procedure. The transmission management information address is information for retrieving transmission management information corresponding to the user ID and indicates a stored portion, in the storage 13, of the transmission management information. The function server 10 executes necessary procedures (e.g., updating of the transmission management information etc.) in order to provide the service designated by the user.

FIG. 3B shows configuration of the transmission management information stored in the transmission management storage 13*d*. The transmission management information includes a list of source files, corresponding to certain user IDs, to be transmitted to the MFP 30 that has accessed using the corresponding user IDs. As shown in FIG. 3B, each piece of transmission management information 13*d* contains pieces of transmission unit information, each of which has a serial number, a name of a source file related to the transmission unit information, attribution information indicating the date and time when the source file was generated, and charging schedule information representing the amount of money charged to the user if the MFP 30 output images correspond to the source file. It should be noted that the serial number is given such that the oldest file has a number "1", and serial numbers are given to the files in accordance with the order of generated date and time.

Figure 4:
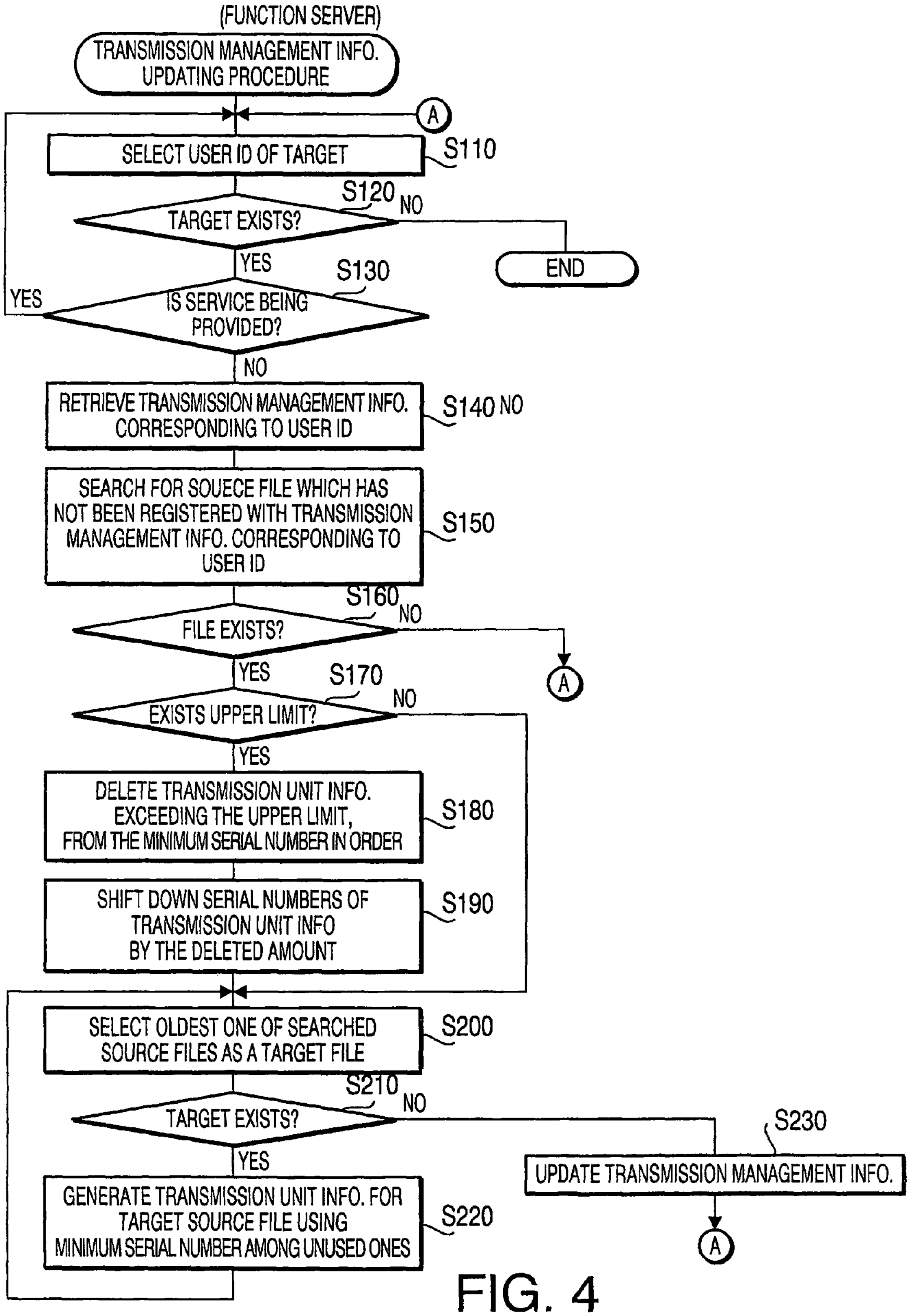
FIG. 4 shows a flowchart illustrating a transmission management information updating procedure according to at least one aspect of the invention.

FIG. 4 is a flowchart illustrating the transmission management information updating procedure executed by the control unit 11 of the function server 10. The transmission information is updated when the transmission management updating procedure is executed.

When the transmission management information updating procedure is executed, the control unit 11 selects the user ID for which the procedure is executed (S110). Specifically, the control unit 11 selects an unprocessed user ID which is a user ID registered with the charging information storage 13*b* and the session management information storage 13*c*, and further has not been processed in steps 140 onwards, as the target user ID. If there is no user ID to be selected as the target ID (i.e., all the user IDs have been selected as the target IDs and processed in steps S140 onwards) (S120: NO), the control unit 11 finishes the transmission management information updating procedure.

If there remains unprocessed user ID(s) (S120: YES), the control unit 11 proceeds to S130. In S130, the control unit 11 accesses the function server 10 using the user ID and determines whether the service providing procedure regarding the user ID is being executed. If the service providing procedure regarding the user ID is being executed (S130: YES), the control unit 11 defers the steps S140 onwards for the user ID, and returns to S110. Then, the control unit 11 selects another user ID as the target ID.

If the control unit 11 determines that the service providing procedure corresponding to the currently selected user ID is not being executed (S130: NO), the control unit 11 proceeds to S140. Then, the control unit 11 retrieves the transmission management information corresponding to the target user ID from the transmission management information storage 13*d* based on the stored content of the session management information storage 13*c*, and stores the retrieved transmission management information in the work area (i.e., RAM) temporarily. Further, based on the registered content of the transmission unit information in the retrieved transmission management information, the control unit 11 searches the source file storage 13*e* (S150) for a source file which has not yet registered with the retrieved transmission management information, thereby judging whether the unregistered source file is stored in the source file storage 13*e* (S160).

The control unit 11 obtains news data and the like to be provided from a predetermined database, in another procedure, and converts the thus obtained data into page-based source files and stores the same in the source file storage 13*e*. It should be noted that this process (another process) is continuously repeated.

If the control unit 11 determines that the unregistered source file is not registered in the source file storage 13*e* (S160: NO), the control unit 11 proceeds to S110 and selects another unprocessed user ID. Then, the control unit 11 executes the steps S120 onwards.

If the control unit 11 determines that the unregistered source files are stored in the source file storage 13*e* (S160: YES), the control unit 11 proceeds to S170. In S170, the control unit 11 judges whether the SUM of the number of pieces of registered transmission unit-information in the transmission management information retrieved above and the number of the unregistered source files which were found in the searching operation in S160 exceeds a predetermined maximum value MAX. If the SUM proceeds the maximum value MAX (S170: YES), the control unit 11 deletes, in the transmission management information stored in the work area, the pieces of transmission unit information corresponding to the portion exceeding the maximum value MAX (i.e., corresponding to the value which is a subtraction of MAX from SUM) in S180. It should be noted that, when the pieces of transmission unit information are deleted, ones having smaller serial numbers are deleted in order.

After execution of S180, the control unit 11 proceeds to S190. In S190, the control unit 11 shifts the serial numbers assigned to the pieces of the transmission unit information in the lower direction (i.e., smaller direction) by an amount equal to the deleted number of pieces. In other words, in the serial number of each piece of transmission unit information, a value (SUM-MAX) is subtracted to update the serial number.

Next, the control unit 11 selects as the target file the source file which is included in the unregistered files detected in step S150, and have not yet been selected as the target file of step S220, and further has the oldest file generation date and time (S200). If there is no target (S210: NO), the control proceeds to S230. In S230, the control unit 11 writes the transmission management information edited in the working area (RAM) into the transmission management information storage 13*d* to update the corresponding portion of the transmission management information of the transmission management information storage 13*d*. Then the control unit proceeds to S110. When steps S140 onwards have been executed for all the user IDs, the control unit 11 finishes the transmission management information updating process.

If there are unprocessed source files (S210: YES), the control unit 11 proceeds to S220. In S220, the control unit 11 generates transmission unit information regarding the source file of the target ID assigned with the minimum serial number from among serial numbers which have no user in the transmission management information stored in the working area (RAM), and registers the same with the transmission management information in the work area (RAM).

At this stage, the control unit 11 generates transmission unit information which includes the minimum serial number, the name of the target source file, the attribution information representing the generation date and time of the source file, and the charging schedule information. When S220 is executed, the control unit 11 proceeds to S200. When S220 is executed the next time, the control generates the transmission unit information regarding the target source file using a new serial number which is a value generated by incrementing the previous serial number by one. Then, the thus generated transmission management information stored in the work area. If the control unit 11 determines that decision in S210 is NO, the control unit 11 stores the transmission management information stored in the work area in the transmission information storage 13*d* to update the corresponding portion (S230).

Figure 5:
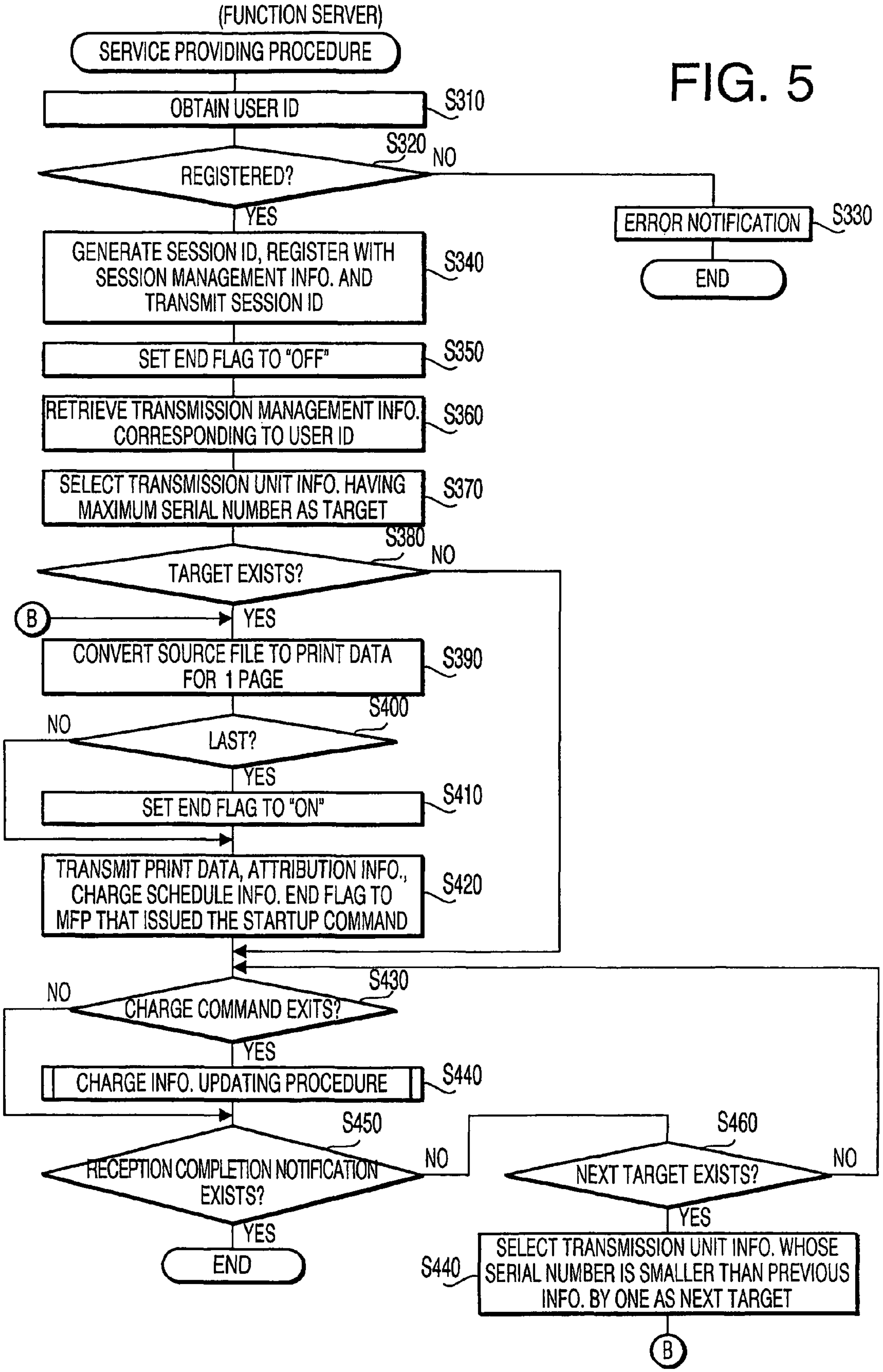
FIG. 5 shows a flowchart illustrating a service providing procedure according to at least one aspect of the invention.

Next, the service providing procedure executed by the control unit 11 with reference to a flowchart thereof is shown in FIG. 5.

The control unit 11 starts the service providing procedure when it receives a service startup command issued by the MFP 30 through the network NT and the communication unit 12.

When the service providing procedure is started, the control unit 11 obtains the user ID received, via the communication unit 12, from the MFP 30 together with the service startup command (S310). In S320, the control unit judges whether the user ID is registered with the storage unit 13. Specifically, by judging whether the charging information and the session management information regarding the user ID are stored in the storage unit 13, the control unit 11 determines whether the obtained user ID is registered with the stored in the storage unit 13.

If the control unit 11 determines that the user ID is not registered in the user ID (S320: NO), the control unit 11 proceeds to S330, where it notifies the MFP 30 of an occurrence of an error. Then, the control unit 11 finishes the service providing procedure. If the control unit 11 determines that the obtained user ID is registered in the storage unit 13 (S320: YES), the control unit 11 proceeds to S340, where it generates the session ID. Then the control unit 11 registers the thus generated session ID with the session management information for the obtained user ID stored in the session management information storage 13*c*. Further, the control unit 11 transmits the thus generated and registered session ID to the MFP 30 that issued the service startup command so that the control unit 11 can identify to which MFP 30 the communication is being made by the session ID.

When the control unit 11 finishes executing S340, it sets the end flag to "OFF" indicating that the data transmission to the MFP 30 has finished (S350), and retrieves the transmission management information corresponding to the user ID obtained in S310 from the transmission management information storage 13*d* (S360). Thereafter, the control unit 11 selects the transmission unit information having the maximum serial number from among the pieces of transmission unit information constituting the transmission management information retrieved above (S370).

If no transmission unit information is registered with the transmission management information (S380: NO), the control unit 11 proceeds to S430. If one or more pieces of transmission unit information is registered with the transmission management information (S380: YES), control proceeds to S390.

In S390, the control unit 11 retrieves the source file having a file name which is represented by the transmission unit file information selected as the target, and the control unit 11 converts the source file into print data corresponding to one page of image which can be printed by the MFP 30. After execution of S390, the control unit 11 judges whether the transmission unit information related to the source file is one having the minimum serial number in the transmission management information retrieved in the above process in order to determine whether the print data based on the source file is the final transmission data (S400).

If the control unit 11 determines that the print data is the final transmission data (S400: YES), the control sets the end flag to "ON" (S410), and the transmits the value of the end flag (i.e., value representing "ON"), print data generated in S390, and attribution data and charging schedule data provided for each transmission unit information of the target to the MFP 30 through the network NT (S420).

If the control unit 11 determines that the print data is not the final transmission data (S400: NO), the control unit 11 proceeds to S420 without executing S410, and transmits the value of the end flag (i.e., value representing "OFF"), print data generated in S390, and attribution data and charging schedule data provided for each transmission unit information of the target to the MFP 30 through the network NT (S420).

After execution of S420, the control unit 11 proceeds to S430. In S430, the control unit 11 determines whether the charging command signal is received from the MFP 30 that issued the service startup command. If the control unit 11 has received the charge command signal (S430: YES), it executes the charging information updating procedure (see FIG. 6) in S440, and proceeds to S450. If the control unit 11 determines that the charge command signal is not received (S430: NO), step S440 is skipped and the control unit 11 proceeds to S450.

In S450, the control unit 11 judges whether the reception completion notification has been received from the MFP 30 that issued the service startup command. If the control unit 11 determines that the receipt completion notification has not been received (S450: NO), it proceeds to S460, where the control unit 11 judges whether there is unprocessed transmission unit information to which the process in S390 has not been applied.

If the control unit 11 determines that there is no unprocessed transmission unit information (S460: NO), the control unit 11 proceeds to S430. If it is determined that there is unprocessed transmission unit (S460: YES), the control unit 11 selects the transmission unit information having a serial number which is smaller, by one, than that of the previously selected target of the process in S390 as the target (S470). Then, the control unit 11 proceeds to S390 and converts the source file related to the transmission unit information of the target to print data for images which can be printed by the MFP 30 that issued the service startup command on one page of the recording sheet.

If the control unit 11 determines that the reception completion notification has been received from the MFP 30 that issued the service startup command (S450: YES), the control unit 11 finishes the service providing procedure.

Figure 6:
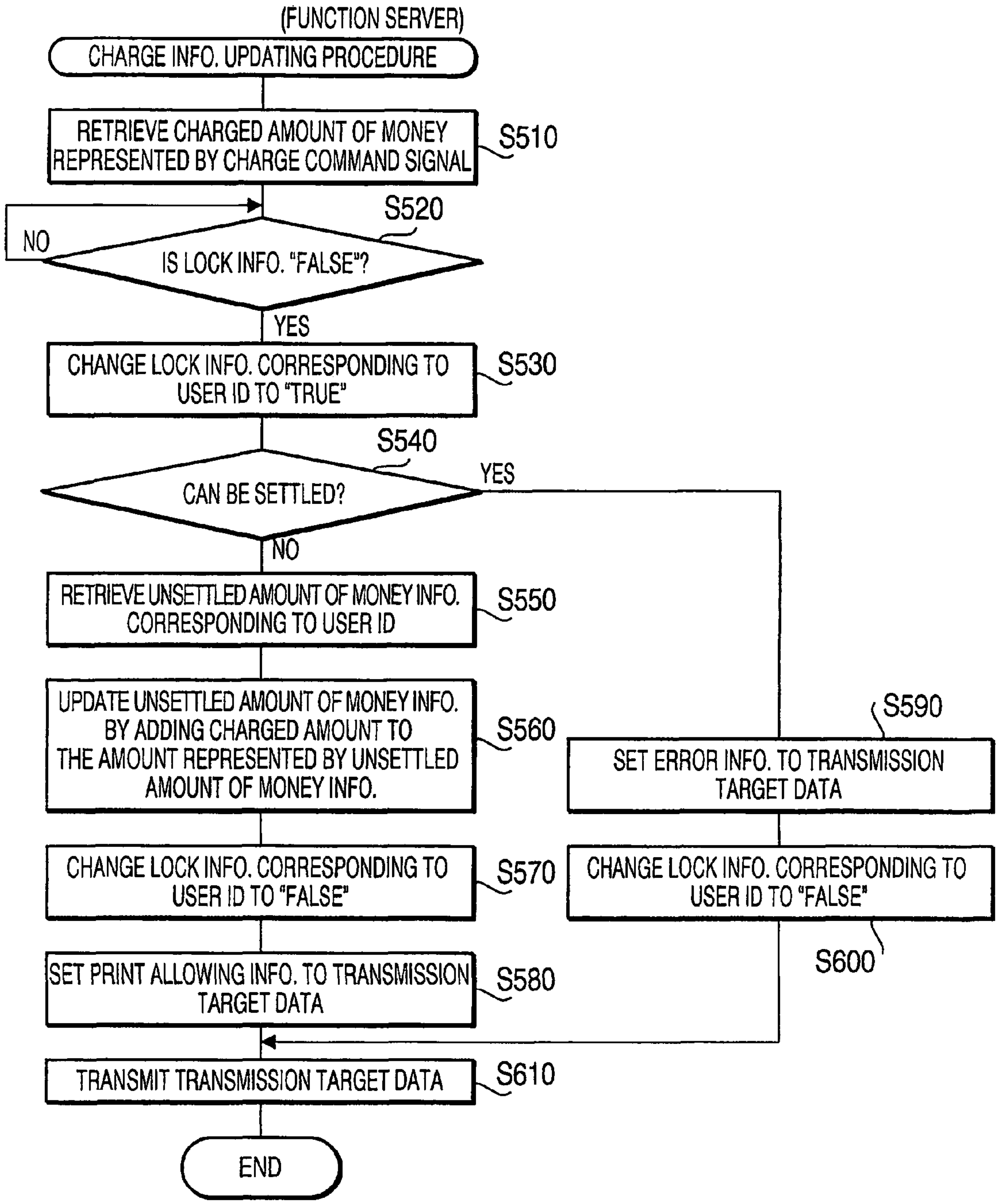
FIG. 6 shows a flowchart illustrating a charge information updating procedure according to at least one aspect of the invention.

Next, the charging information updating procedure executed in S440 of FIG. 5 will be described with reference to the flowchart shown in FIG. 6.

When the charging information updating procedure is started, the control unit 11 obtains information indicative of the charged amount of money included in the charge command signal received from the MFP 30 (S510). Then, the control unit 11 judges whether the lock information of the charge information corresponding to the user ID obtained in S310 indicates the value "FALSE" (S520). If the lock information does not indicate the value "FALSE" (i.e., it indicates the value "TRUE") (S520: NO), the control unit 11 pauses until the lock information turns to "FALSE".

If the control unit 11 determines that the lock information indicates the value "FALSE" (S520: YES), the control unit 11 proceeds to S530, where the value of the lock information of the above user ID stored in the charging information storage 13*b* is changed from "FALSE" to "TRUE". Then, the control unit 11 proceeds to S540 and judges whether the charge can be settled based on the charge information for the user ID.

Specifically, the control unit 11 judges whether the effectiveness information of the charging information has the value "TRUE" or "FALSE", and if the value is "FALSE", the determination in S540 is "NO".

Further, in S540, if the payment method is the credit card, the control unit 11 judges whether the effective date is expired based on the settlement attribution information. If the effective date is expired, the decision in S540 is "NO". If the payment method is the prepaid card, the control unit 11 judges whether the prepaid card contains remaining funds equal to or larger than the half of the available amount of money, the decision in S540 is "NO".

If the control unit 11 determines that the charge can be settled (S540: YES), the control unit 11 proceeds to S550. In S550, the control unit 11 retrieves the unsettled amount of money information from the charging information of the above user ID stored in the charging information storage 13*b*. Then, the control unit 11 adds the value represented by the information indicating the amount of money charged to the value represented by the amount of money, and the sum is stored in the charging information storage 13*b* as the unsettled amount of money, thereby updating the unsettled amount of money information of the above user ID (S560).

After execution of S560, the control unit 11 change the lock information corresponding to the above user ID stored in the charging information storage 13*b* into "FALSE" (S570), and then the control unit 11 sets a print allowing information that allows the MFP 30 to print the amount of money charged indicated by the charge command signal (S580), and proceeds to S610.

If the control unit determines that settlement of the amount of money cannot be done (S540: NO), the control unit 11 proceeds to S590. In S590, after setting the error information to the transmission target data (S590), the control unit 11 changes the lock information corresponding to the above user ID stored in the charging information storage 13*b* to "FALSE" (S600) and proceeds to S610.

In S610, the control unit 11 transmits a response signal to the charging command signal containing the transmission target data set in S580 or S600 to the MFP 30 that issued the service startup command. Then, the control unit 11 finishes the charging information updating procedure.

Next, the configuration and operation of the MFP 30 will be described with reference to FIGS. 1, 7 and other drawings.

As shown in FIG. 1, the MFP 30 includes a control unit 31, an operation unit 32, a reading unit 33, a recording unit 34, a communication unit 35, a storage unit 36, a sound input unit 37, a sound output unit 38 and a display unit 39. The control unit 31 includes a well-known CPU, ROM and RAM, and it controls the entire operation of the MFP 30. It should be noted that the ROM stores various programs to be executed by the CPU (e.g., a program for the data reception procedure shown in FIG. 7). The RAM stores reception management information and selection information as shown in FIGS. 9A and 9B.

The operation unit 32 includes keys (not shown), including up/down/right/left cursor keys, operable by a user. As the user operates the keys, the operation unit 32 obtains operational information and transmits the operational information to the control unit 31. The reading unit (scanner) 33 is configured to read an image recorded (e.g., printed) on an original, and generates image data representing the read image. The recording unit (printer) 34 is configured to form (print) an image on a sheet-type recording medium in accordance with the print data. The communication unit 35 performs data transmission/reception with an external device such as the function server 10 via the network NT.

The storage unit 36 includes a non-volatile RAM, in which various pieces of setting information are stored. The sound input unit 37 collects sound with a microphone provided to a handset (not shown) and generates sound data (e.g., PCM data) representing the collected sound. The sound output unit 38 is configured to output sound through a speaker provided to the handset, or a speaker (not shown) provided to the body of the MFP 30 in accordance with the sound data (PCM data). The display unit 39 includes an LCD (Liquid Crystal Display) on which information is displayed for the user.

Figure 7:
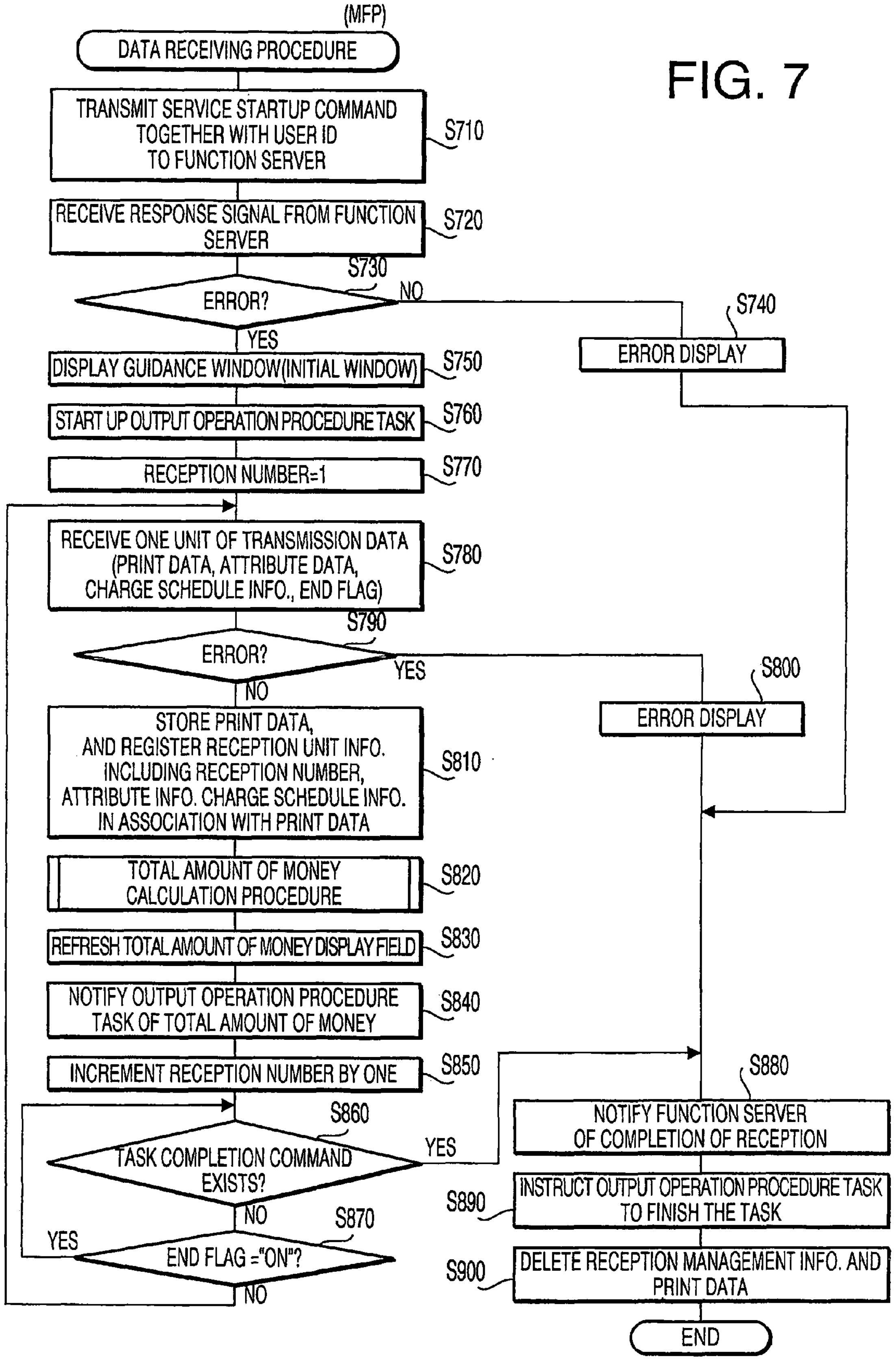
FIG. 7 shows a flowchart illustrating a data receiving procedure according to at least one aspect of the invention.
Figures 8, 9A, 9B:
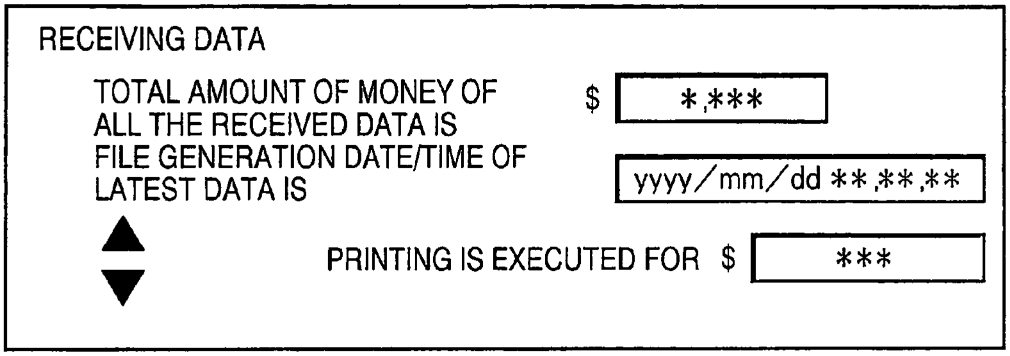
FIG. 8 illustrates a structure of a guidance window displayed on a display unit according to at least one aspect of the invention.
FIG. 9A shows a structure of reception management information according to at least one aspect of the invention.
FIG. 9B shows a structure of selection information according to at least one aspect of the invention.

FIG. 7 shows a flowchart illustrating a data reception procedure executed by the control unit 31.

The control unit 31 of the MFP 30 starts the data reception procedure when information instructing the startup of the service through the operation unit 32 or by the timer. In S710, the control unit 31 transmits the service startup command to the function server 10 via the network NT. Further, the control unit 31 transmits the user ID which was input through the operation unit 32 together with the startup command for the service, or the user ID having been registered with the MFP 30 in advance.

Then, the control unit 31 proceeds to S720, and receives a response signal from the function server 10. The response signal here is a signal indicating an error notification transmitted from the function server 10, or a signal indicating the session ID transmitted from the function server 10.

When the response signal is received, the control unit 31 judges whether the error occurs on the function server side (S730). If the response signal indicates the error status (S730: YES), the control unit 31 displays an error message on the display unit 39 (S740), and proceeds to S880.

If the response signal does not indicate the error status (S730: NO), the control unit 31 displays a guidance window (initial window) regarding the services to be provided on the display unit 39 (S750).

FIG. 8 shows an example of the guidance window displayed in S750. As shown in FIG. 8, the guidance window has a status display field indicating the communication status of the MFP 30, an amount of money display field showing the amount of money charged to the user if the images corresponding to all the print data are printed, a date/time display field showing date and time when the source file regarding the latest print data was generated, and a second amount of money display field showing the amount of money charged to the user if the image corresponding to the selected portion of the print data that is received from the function server 10 is printed.

When S750 is executed, the display fields described above are blank since information regarding the total amount of money, date and time when the file was generated has not been collected.

Figure 11:
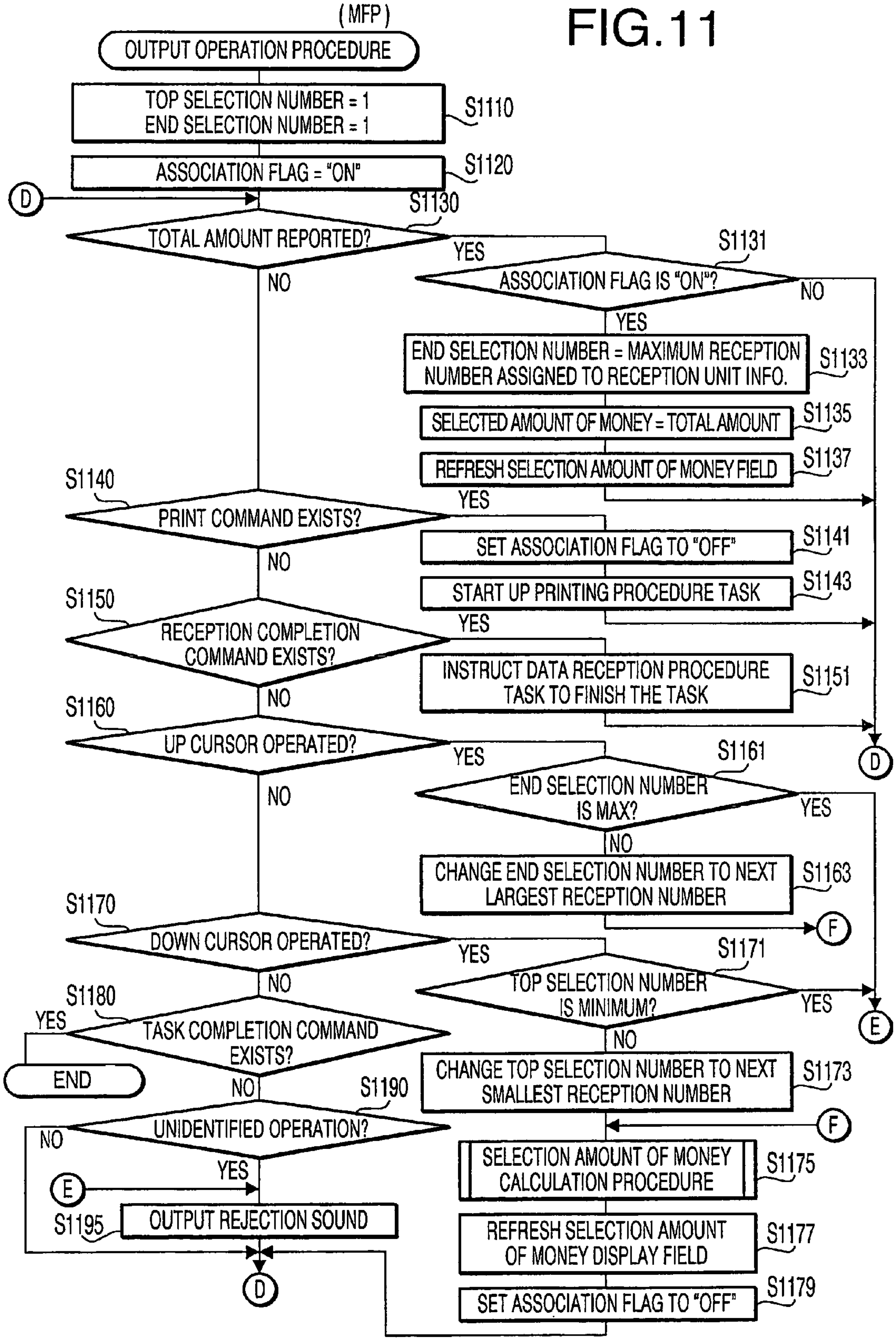
FIG. 11 shows a flowchart illustrating an output operation procedure according to at least one aspect of the invention.

After execution of S750, the control unit 31 starts an output operation procedure task that executes the output operation procedure shown in FIG. 11 (S760), sets the parameter value indicating the reception number to "1" (S770), and proceeds to S780. It should be noted that the reception number is the number for managing the print data and the like received from the function server 10, and will be used for editing the reception management information (see FIGS. 9A and 9B), which will be described later.

In S780, the control unit 31 receives the transmission data for one unit that is transmitted from the function server 10 in S420, and proceeds to S790. It should be noted that a piece of the transmission data includes print data for one page, attribution data thereof, charge schedule information indicating the amount of money charged to the user if the images corresponding to the print data are printed, and the end flag. It should be noted that, if the control unit 31 has not received the transmission from the function server 10 for a predetermined period in S780, the control unit 31 proceeds to S790 without completing the data reception.

In S790, the control unit 31 judges whether an error has occurred during the process of the data transmission described above. If the control unit 31 has not received the transmission data from the function server 10, it determines that an error has occurred, while if the control unit 31 has received the transmission data, the control unit 31 determines that an error has not occurred.

If it is determined that an error has occurred (S790: YES), the control unit 31 proceeds to S800 and displays an error message on the display unit 39. If it is determined that an error has not occurred (S790: NO), the control unit 31 proceeds to S810, and stores the print data in the RAM of the control unit 31, and registers the reception unit information regarding the print data with the reception management information stored in the RAM of the control unit 31.

FIG. 9A shows a configuration of the reception management information stored in the MFP 30. The reception management information includes the reception number, information representing the name of the received print data, attribution data received together with the print data and the charge schedule data.

In S810, the control unit 31 generates the reception unit information in accordance with the parameter value representing the reception number set in S770 (first time) or with the parameter value updated in S850 (second time onwards), information representing the received print data, attribution data received together with the print data and the charge schedule information. As the control unit 31 stores the above in the RAM provided to the control unit 31, thereby updating the reception management information, it should be noted that the reception management information is generated when the reception unit information is registered the first time.

After execution of S810, the control unit 31 proceeds to S820 and executes the total amount of money calculating procedure in order to calculate the total amount of money charged to the user if the images corresponding to all the image data received from the function server 10 are printed.

Figure 10:
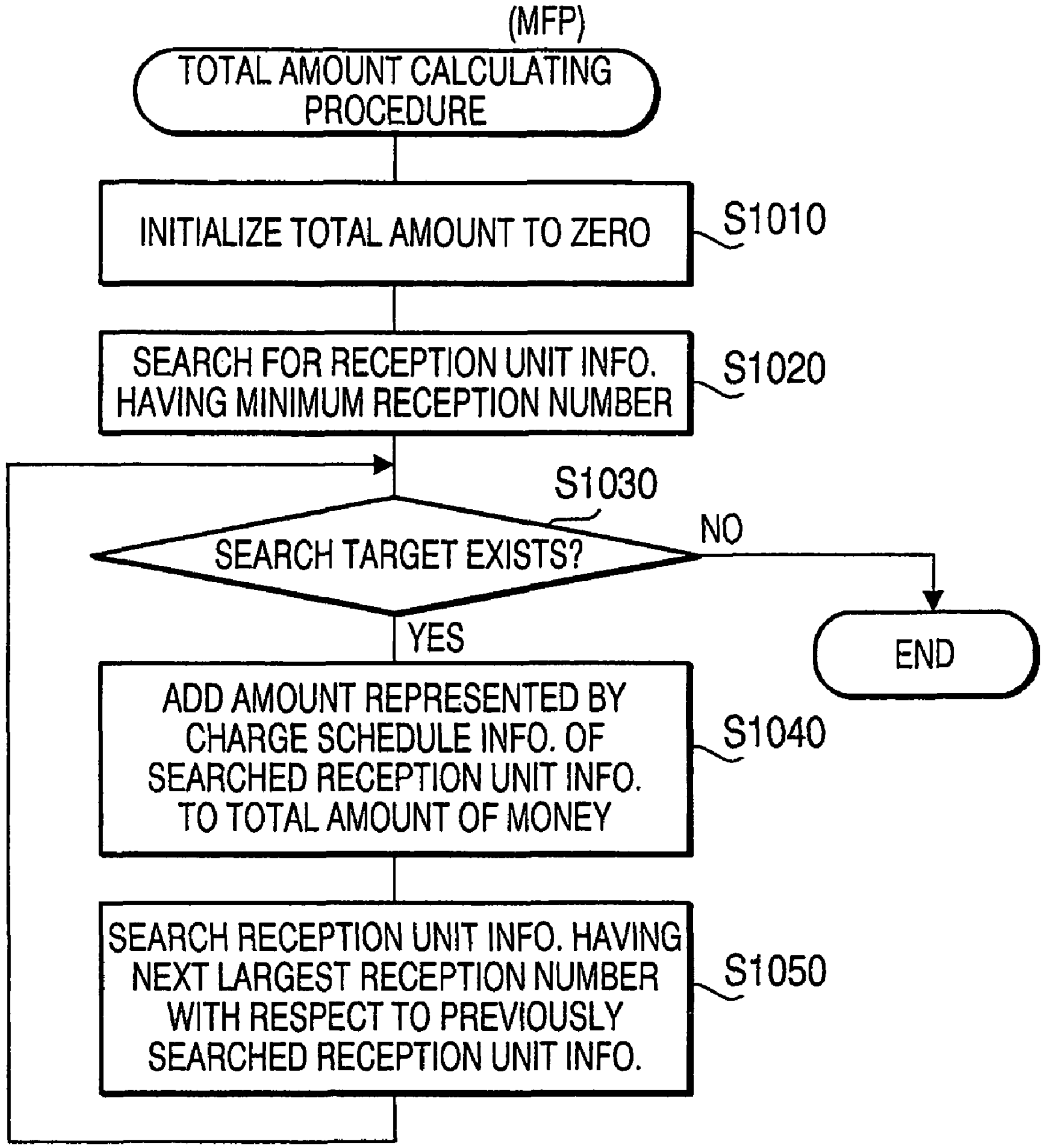
FIG. 10 shows a flowchart illustrating a sum calculating procedure according to at least one aspect of the invention.

FIG. 10 shows a flowchart illustrating the total amount of money calculating procedure executed by the control unit 31. When the total amount of money calculating procedure is started, the control unit 31 initializes the value of a parameter indicating the total amount of money (i.e., set to 0) in S1010. Then, in S1020, the control unit 31 searches the reception management information for the reception unit information having the minimum reception number among pieces of the reception unit information constituting the reception management information (S1020). When the search is completed (S1030: YES), the control unit 31 proceeds to S1040 and adds the amount of money indicated in the charge schedule information of the searched reception unit information to the parameter representing the total amount of money.

After execution of S1040, the control unit 31 proceeds to S1050. In S1050, the control unit 31 searches for the reception unit information having the smallest reception number among the remaining reception unit information. That is, after execution of S1020, the control unit 31 searches the reception unit information having the second smallest reception number during the first execution of S1050, and the next greater reception number than the reception number of the previously selected reception unit information during second or later execution of S1050.

If there is reception unit information having the second smallest reception number in the reception management information (S1030: YES), the control unit 31 adds the amount of money represented by the charge schedule information of the reception unit information to the parameter value representing the total amount of money (S1040).

If there is no reception unit information having the second smallest reception number in the reception management information (S1030: NO), the control unit 31 finishes the total amount of money calculating procedure.

As described above, in the total amount of money calculation procedure, the sum of the amount of money represented by the charge schedule information of each reception unit information constituting the reception management information is calculated. It should be noted that, in the reception management information, only the reception unit information regarding the print data which has not been printed is included. Therefore, by calculating the sum of the amount of money represented by the charge schedule information of each reception unit information of the reception management information, the total amount of money charged to the user can be obtained.

After finishing the total amount of money calculating procedure, the control unit 31 proceeds to S830 to update the total amount of money display field, and controls the display 39 to display the calculated total amount of money (i.e., the parameter value representing the total amount of money). At this stage, the control unit 31 also updates the date/time display field and the latest generating date/time of the source file regarding the latest print data is displayed on the display unit 39.

After execution of S830, the control unit 31 notifies the output operation procedure task started up in S760 of the total amount of money (S840), and increments the parameter representing the reception number by one (S850).

After execution of S850, the control unit 31 proceeds to S860, and judges whether a task completion command is issued by the output operation procedure task. If the control unit 31 determines that the task completion command is issued (S860: YES), it proceeds to S880. If a command has not been issued (S860; NO), the control unit 31 proceeds to S870. In S870, the control unit 31 judges whether the value of the end flag is ON.

If the control unit 31 determines that the value of the end flag is not "ON" (S870: NO), the control unit 31 proceeds to S780. Then, the control unit 31 receives the data successively transmitted from the function server 10 (print data, attribution information, charge schedule information, end flag) and, based on the received data, the control unit 31 registers a new piece of reception unit information to which a new reception number after update is assigned with the reception management information (S810). Then, the control unit 31 calculates the total amount of money (S820) and updates the total amount of money field (S830). Then, the control unit 31 notifies the output operation procedure task of the total amount of money (S840). After execution of S840, the control unit 31 increments the value of the parameter representing the reception number by one to update the same (S850).

The control unit 31 repeats the above processes (i.e., steps S780-S850) till the end flag is turned to "ON" state, until an error occurs or until the task completion command is issued by the output operation procedure task. If the control unit 31 determines that the value of the end flag is "ON" (S870: YES), the control proceeds to S860 and pauses until the task completion command is issued by the output operation procedure task. If the task completion command is input (S860: YES), the control unit 31 proceeds to S880, and transmits the reception completion notification to the function server 10.

If the end flag is not "ON" but the task completion command is issued by the output operation procedure task and the reception completion notification is transmitted, the reception completion notification serves as a command signal instructing the function server 10 to stop transmitting the print data. That is, when the reception completion notification is received, the decision in S450 is YES, and the control unit 31 finishes the service providing procedure, and stops providing the service by transmitting the print data and the like.

After execution of S880, the control unit 31 inputs a task completion indication into the output operation procedure task (S890). Then, the control unit 31 deletes the reception management information and the print data stored in the RAM of the control unit 31 (S900), and finishes the data reception procedure.

Next, the output operation procedure executed by the control unit 31 will be described with reference to a flowchart shown in FIG. 11.

When the output operation procedure is started, the control unit 31 keeps a selected information storage area for storing the selected information in the RAM of the control unit 31 (S1110). Further, the control unit 31 sets the value of the parameter representing the top selection number to "1", and sets the value of the parameter representing the end selection number to "1". It should be noted that FIG. 9B shows a configuration of the selection information. As shown in FIG. 9B, the selection information includes a parameter value of a top selection number, a parameter value of an end selection number, and a parameter value representing a selected amount of money displayed as the selected amount of money.

After execution of S1110, the control unit 31 proceeds to S1120 and sets the association flag to "ON". It should be noted that the association flag represents whether a printing area is to be automatically set to include the area of the lastly received print data. When the association flag is ON, the print output area is automatically set so as to include the area of the print data the MFP 30 received lastly.

After execution of S1120, the control unit 31 proceeds to S1130, and determines whether the total amount of money has been reported from the data reception procedure task in S840. If the control unit 31 determines that the total amount of money has been reported (S1130: YES), it judges whether the association flag is ON (S1131). If the association flag is not "ON" (S1131: NO), the control unit 31 proceeds to S1130. If the association flag is "ON" (S1131: YES), the value of the parameter value representing the end selection number is set to the maximum value of the reception number assigned to the reception unit information of the reception management information (S1133).

After execution of S1133, the control unit 31 sets the value of the parameter representing the selected amount of money to the latest total amount of money calculated in the total amount of money calculating procedure (S1135), and proceeds to S1137. Then, the control unit 31 updates the amount of money display field and displays the value of the parameter representing the selected amount of money set in S1135 on the display unit 39.

If the control unit determines that the total amount of money has not been reported from the data reception procedure task (S1130: NO), the control unit 31 proceeds to S1140, and judges whether the print command has been input by the user through the operation unit 32. If the control unit 31 determines that the print command has been input (S1140: YES), the control unit 31 proceeds to S1141. In S1141, the control unit 31 sets the association flag to "OFF", and starts a printing procedure task (S1143) that executes the printing procedure shown in FIG. 13. Then, the control unit 31 proceeds to S1130. When the printing procedure task is operating, part of the input operation through the operating unit 32 is disabled as the control unit 31 makes a negative decision at each of S1140, S1160 and S1170.

If the control unit 31 determines that the print command has not been input (S1140: NO), the control unit 31 proceeds to S1150. In S1150, the control unit 31 judges whether the user has input the reception terminating command through the operation unit 32. If the reception terminating command has been input (S1150: YES), the control unit 31 proceeds to S1151, and inputs the task completion command to the data receiving procedure task (S1151). This input is received by the data receiving procedure task (S860: YES).

After execution of S1151, the control unit 31 proceeds to S1130. If the control unit 31 determines that the reception termination command has not been input (S1150: NO), the control unit 31 proceeds to S1160 and judges whether the up cursor key of the operation unit 32 have been operated.

If the control unit 31 determines that the up cursor key has been operated (S1160: YES), the control unit 31 proceeds to S1161, and judges whether the value of the parameter representing the end selection number coincides with the maximum reception number assigned to the reception unit information of the reception management information (S1161). If the value of the parameter coincides with the maximum value of the reception number (S1161: YES), the control unit 31 controls the speaker to output a rejection sound (warning sound) in S1195. Then, the control unit 31 proceeds to S1130.

If the control unit 31 determines that the value of the parameter representing the end selection number does not coincide with the maximum value of the reception number assigned to the reception unit information of the reception management information (S1161: NO), the control unit 31 proceeds to S1163 and changes the value of the parameter representing the end selection number to the reception number greater than the current value of the parameter representing the end selection number, and the reception number closest to the current value of the parameter among the reception numbers assigned to the reception unit information of the reception management information (S1163). Then, the control unit 31 proceeds to S1175.

If the control unit 31 determines that the up cursor key is not operated by the user (S1160: NO), the control unit 31 proceeds to S1170 and judges whether the down cursor key of the operation unit 32 is operated. If the control unit 31 determines that the down cursor key has been operated (S1170: YES), the control unit 31 proceeds to S1171. In S1171, the control unit 31 determines whether the value of the parameter representing the top selection number coincides with the minimum value of the reception number assigned to the reception unit information of the reception management information. If the parameter value coincides with the minimum value (S1171: YES), the control unit 31 causes the speaker to output a rejection sound (S1195) and then proceeds to S1130.

If the control unit 31 determines that the value of the parameter representing the top selection number does not coincide with the reception number assigned to the reception unit information of the reception management information (S1171: NO), the control unit 31 proceeds to S1173. In S1173, the control unit 31 changes the value of the parameter representing the top selection number to the reception number that is one of the reception numbers assigned to the pieces of reception unit information of the reception management information, smaller than the current value of the parameter representing the top selection number and closest to the current value of the reception parameter.

After execution of S1173, the control unit 31 proceeds to S1175, and executes the selected amount of money calculation procedure. In the selected amount of money calculation procedure, the value of the parameter representing the selected amount of money which would be charged to the user if all the print data related to the reception unit information having the reception numbers ranging from the parameter value of the top selection number to the parameter value of the end selection number is output.

Figure 12:
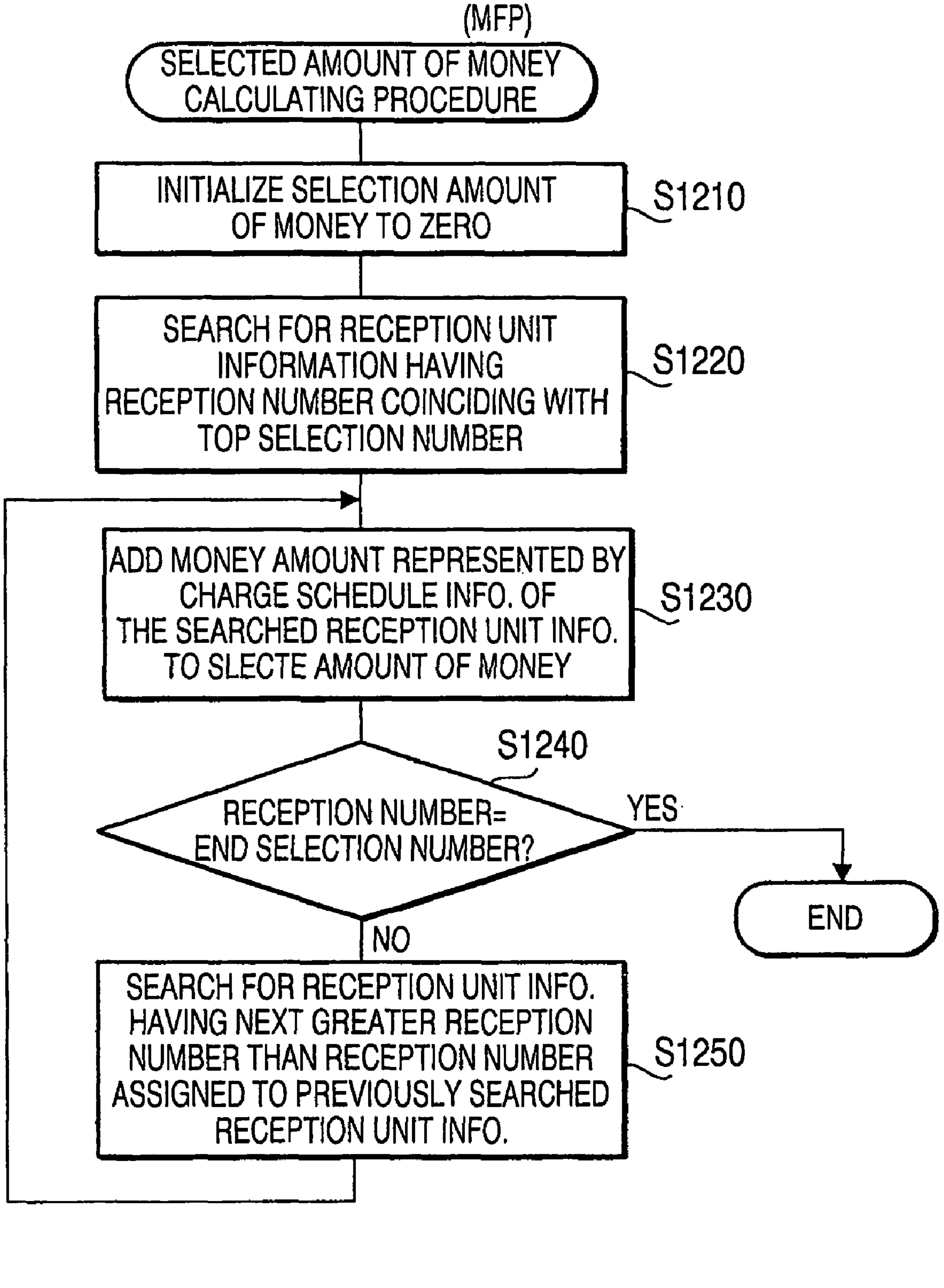
FIG. 12 shows a flowchart illustrating a selected amount of money calculation procedure according to at least one aspect of the invention.

FIG. 12 shows a flowchart illustrating the selected amount of money calculating procedure to be executed by the control unit 31.

When the selected amount of money calculating procedure is started, the control unit 31 initializes the value of the parameter representing the selected amount of money (i.e., set the value of the selected amount of money to "0") in S1210. Then, the control unit 31 detects the reception unit information to which the reception number coincides with the value of the parameter representing the top selection number in S1220. After the detection is completed, the control unit 31 proceeds to S1230. In S1230, the control unit 31 adds the amount of money represented by the charge schedule information of the reception unit information as detected to the value of the parameter representing the selected amount of money.

After execution of S1230, the control unit 31 proceeds to S1240, and judges whether the reception number of the reception unit information previously detected coincides with the value of the parameter representing the end selection number. If they do not coincide with each other (S1240: NO), the control unit 31 proceeds to S1250. In S1250, the control unit 31 searches the reception management information for a piece of the reception information to which a next largest reception number is assigned with respect to the reception number of the previously searched piece of the reception unit information (which is the reception number of the reception unit information searched for in S1220 when S1250 is firstly executed, and the reception number of the reception unit information searched in S1250 when S1250 is executed a second time or later).

After execution of S1250, the control unit 31 proceeds to S1230, and adds the amount of money represented by the charge schedule information of the reception unit information searched in previous execution of S1250 to the value of the parameter representing the selected amount of money. Then, the control unit 31 proceeds to S1240.

If the control unit 31 determines that the reception number of the reception unit information previously searched for coincides with the value of the parameter representing the end selection number (S1240: YES), the control unit 31 finishes the selected amount of money calculating procedure. As described above, in the selected amount of money calculating procedure, the amount of money which would be charted to the user if the print data related to pieces of reception unit information having the reception numbers ranging from the top selection number to the end selection number is printed out, and the amount of money is set to the set amount of money.

After execution of the selected amount of money calculating procedure, the control unit 31 proceeds to S1177, and updates the selected amount of money display field and displays the selected amount of money (i.e., the value of the parameter of the selected amount of money) obtained in S1175 on the display unit 39. After execution of S1177, the control unit 31 sets the association flag to "OFF" (S1179), and proceeds to S1130.

If the control unit 31 determines that the down cursor key has not been operated by the user (S1170: NO), the control unit 31 proceeds to S1180. In S1180, the control unit 31 judges whether the task completion command has been input by the data receiving procedure task in accordance with step S890 executed by the data receiving procedure task. If the control unit 31 determines that the task completion command has been input (S1180: YES), the control unit 31 finishes the output operation procedure. If the control unit 31 determines that the task completion command has not been input (S1180: NO), the control unit 31 proceeds to S1190, and judges whether the user has made an unknown operation through the operation unit 32. It should be noted that the "unknown operation" here means any operation other than the operations corresponding to printing, operations related to reception termination, operation of up cursor key and down cursor key. In other words, any key operation not related to decision making in S1150, S1160, S1170 and S1180 is regarded as an unknown operation.

If the control unit 31 determines that an unknown operation has been performed by the user (S1190: YES), the control unit 31 controls the speaker to output a rejection sound (S1195), and proceeds to S1130. If the user has not operated the operation unit 32, and each of the notification of the total amount of money and task completion command has not been input from the data receiving procedure task (S1190: NO), the control proceeds to S1130.

Figure 13:
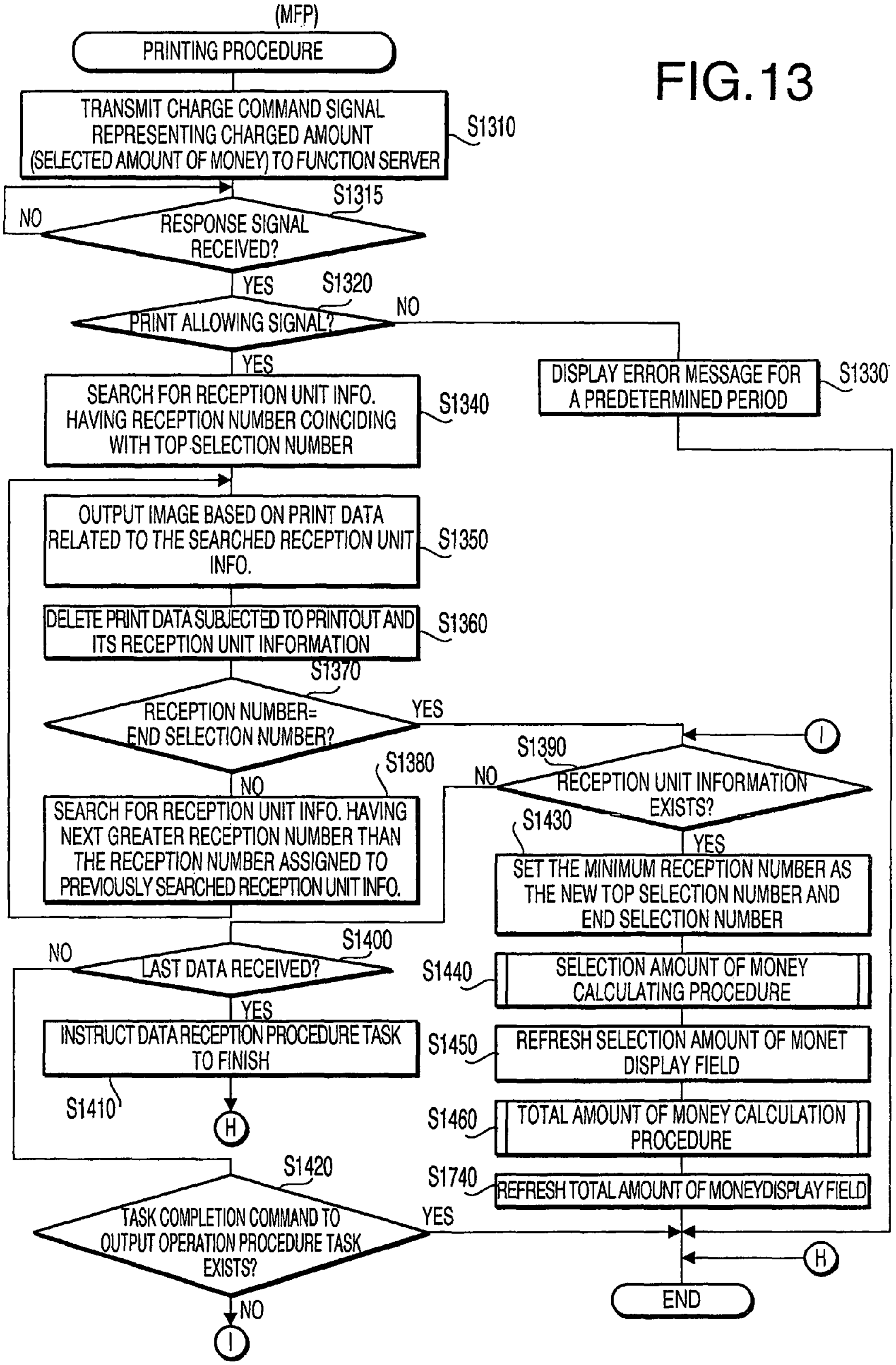
FIG. 13 shows a flowchart illustrating a printing procedure according to at least one aspect of the invention.

Next, with reference to a flowchart shown in FIG. 13, the printing procedure executed by the control unit 31 will be described. It should be noted that the printing procedure task, data receiving procedure task and the output operation procedure task are executed in parallel on the control unit 31.

When the printing procedure is started, the control unit 31 generates a charge command signal containing the value of the parameter representing the selected amount of money as information representing the charged amount of money in S1310, and transmits the charge command signal to the function server via the network NT.

After execution of S1310, the control unit 31 pauses until the response signal is received from the function server 10 (S1315). If the control unit 31 receives the response signal (S1315: YES), the control unit 31 judges whether the response signal is one containing the print allowance information (i.e., the print allowing signal) in S1320. It should be noted that, in S1320, if the response signal containing the error information is received from the function server 10, the decision in S1320 is "NO", and if the response signal containing the print allowing signal, as above, the decision in S1320 is "YES".

When the decision at S1320 is "NO", the control unit 31 proceeds to S1330, and displays an error message window showing an error message on the display unit 39, instead of the guidance window (FIG. 8) for a predetermined period. Thereafter, the control unit 31 finishes the printing procedure.

When the decision at S1320 is "YES", the control unit proceeds to S1340, and searches the reception management information for the reception unit information to which the reception number coinciding with the value of the parameter representing the top selection number. After execution of S1340, the control unit 31 inputs the print data related to the reception unit information searched for in S1340 into the recording unit 34 so that images based on the print data are output by the recording unit 34 (S1350). Thus, the recording unit 34 forms the images represented by the print data on the sheet-type recording medium.

After execution of S1350, the control unit 31 deletes the print data representing images which have been output from the RAM. Further, the control unit 31 deletes the reception unit information related to the print data from the reception management information (S1360). After execution of S1360, the control unit 31 judges whether the reception number assigned to the previously searched reception unit information (the reception unit information corresponding to the print data that has been subjected to be output previously) coincides with the value of the parameter representing the end selection number (S1370).

If they do not coincide with each other (S1370: NO), the control unit 31 proceeds to S1380, and searches the reception management information for the reception unit information having the reception number having the next largest reception number with respect to the reception number assigned to the previously searched reception unit information (i.e., the reception unit information corresponding to the print data having been subjected to printing previously). Then, the control unit 31 controls the recording unit 34 to form images based on the print data related to the searched reception unit information (S1350). Then, in S1360, the control unit 31 deletes the print data from the RAM of the control unit 31. Further, the control unit 31 deletes the reception unit information corresponding to the print data from the reception management information. Thereafter, the control unit 31 proceeds to S1370.

If the reception number assigned to the previously searched reception unit information (the reception unit information corresponding to the print data previously subjected to print output) coincides with the value of the parameter representing the end selection number (S1370: YES), the control unit 31 proceeds to S1390. In S1390, the control unit 31 judges whether one or more pieces of reception unit information is registered with the reception management information. If the control unit 31 determines that reception unit information is not registered (i.e., there is no reception unit information) (S1390: NO), the control unit 31 proceeds to S1400, and judges whether the data receiving procedure task has received the final data transmitted from the function server 10.

If the control unit 31 determines that the final data has been received (S1400: YES), the control unit 31 inputs the task completion command into the data receiving procedure task (S1410), and then finishes the printing procedure. If the control unit 31 determines that the final data has not been received (S1400: NO), the control unit 31 proceeds to S1420. In S1420, the control unit 31 judges whether the task completion command has been input from the data receiving procedure task to the output operation procedure task. If the task completion command has been input to the output operation procedure task (S1420: YES), the control unit 31 finishes the printing procedure. If the control unit 31 determines that the task completion command has not been input (S1420: NO), the control unit 31 proceeds to S1390 and waits for registration of new reception unit information.

If the control unit 31 determines that one or more piece of reception unit information is registered with the reception management information (S1390: YES), the control unit 31 proceeds to S1430. In S1430, the control unit 31 sets the value of the parameter representing the top selection number to the minimum value of the reception number assigned to the reception unit information of the reception management information, and sets the value of the parameter representing the end selection number to the minimum value of the reception number assigned to the reception unit information of the reception management information.

Thereafter, the control unit 31 executes the selected amount of money calculating procedure shown in FIG. 12 (S1440), updates the selected amount of money display field (S1450), executes the total amount of money calculating procedure shown in FIG. 10 (S1460), and updates the total amount of money field (S1470). Then, the control unit 31 finishes the printing procedure.

According to the communication system 1 described above, when the service startup command is transmitted from the MFP 30 to the function server 10, the function server 10 subsequently converts a group of source files, which have been registered with the transmission management information corresponding to the user of the MFP 30 that issued the service startup command, and are prepared on a page basis, into print data based on which the MFP 30 can form (print) images (S390). Then, the converted print data is transmitted to the MFP 30 that issued the service startup command (S420).

When the MFP 30 receives the page-based print data transmitted from the function server 10 through the communication unit 35 (S780), the MFP 30 assigns the reception number to each piece of the print data in the order of reception, and stores each piece of data in the RAM provided to the control unit 31 (S810). Further, the MFP 30 generates the reception unit information containing the charge schedule information received from the function server together 10 with the print data and stores the same. Then, the MFP 30 calculates the sum of the amount of money indicated by the charge schedule information of each piece of reception unit information every time when the print data is received and/or printing is performed, and displays the total amount of money in the display field (S820, S830, S1460 and S1470). With the above operation, the MFP 30 displays the amount of money to be charged in the total amount of money field if the print data received from the function server 10 and stored but not printed is all output.

The MFP 30 described above is configured such that a printout range is changed on a page basis (i.e., unit of print data) in accordance with the operation information input by the user through the operation unit 32. Specifically, the MFP 30 stores the top selection number in the RAM as the information for identifying the print data for the top page of print out. Further, the MFP 30 stores the end selection number in the RAM as the information for identifying the print data of the end page of the printout. In this illustrative embodiment, every time when the up or down cursor key is operated, the top selection number or the end selection number is updated (S1163, S1173).

Therefore, the user can designate the print start page and print end page by operating the up cursor key and down cursor key while monitoring the total amount of money display field. Further, according to the illustrative embodiment, the operational information of the up and down cursor keys (i.e., the designation information of the top selection number and end selection number) also functions as information representing the amount of money the user agrees to be charged.

According to the MFP 30 described above, when the top selection number and end selection number are updated, the control unit 31 calculates sum of the amount of money indicated by the charge schedule information regarding the print data, which is received from the function server 10, which corresponds to the reception numbers from the top selection number to the end selection number, and which has not yet been printed out, updates the value of the parameter representing the selected amount of money (S1175), and displays the selected amount of money in the selected amount of money display field (S1177).

Therefore, the user can indirectly designate the amount of money to be charged by operating the up and down cursor keys with monitoring the information displayed in the selected amount of money display field. Thus, the user can make the MFP 30 output necessary images, and avoid unnecessary charging.

In the above illustrative embodiment, the MFP 30 is configured such that the allowable amount of money which can be charged is input by operating the up and down cursor keys. Optionally or alternatively, the MFP 30 may be configured such that the allowable amount of money which can be charged is directly input using the input (e.g., numeric) keys or the like of the operation unit 32.

According to the MFP 30 described above, when the print command is input through the operation unit 32 (S1140: YES), before printing operation is executed in response to the print command, the MFP 30 transmits the charge command signal containing the amount of money to be charged regarding the print data subjected to print (S1310). It should be noted that, in such a case, the value of the parameter representing the selected amount of money is set to the charged amount of money.

If the MFP 30 receives the charge command signal containing the amount of money charged regarding the print data transmitted in S1310 before the printing operation is executed (S430: YES), the function server 10 adds the amount of money charged to the value represented by the unsettled amount of money to update the unsettled amount of money. Thus, the charging procedure is executed corresponding to the output amount of the MFP 30 (S510-S560).

If the charge procedure has been normally executed (i.e., S540: YES; and steps S550 onwards have been executed), the print allowing signal is transmitted to the MFP 30 that issued the service startup command (S580, S610) and allows the MFP 30 to output (print) the printout of the amount of money charged.

Further, the MFP 30 transmits the charge command signal and then pauses until it receives the response signal (S1315). Until the response signal is received, the MFP 30 does not execute steps S1340 and later. When the print allowing signal is received as the response signal (S1320: YES), S1340 and the following steps are executed so that print output in accordance with the print command is made (S1350-S1380). It should be noted that, even if the response signal is received, if the response signal contains the error information (S1320: NO), steps S1340 and the following steps are not executed, and printing according to the print command is cancelled.

When the printing is executed, pieces of print data corresponding to reception numbers ranging from the top selection number to the end selection number designated by the user through the operation unit 32 are processed in the order of reception from the function server 10 (i.e., in the ascending order of the reception number) so that printing operation corresponding to the selected amount of money is executed. When the print out corresponding to the selected amount of money has been made (S1370: YES), the printing procedure is stopped.

According to the above-described illustrative embodiment, the MFP 30 checks whether the printout is necessary and executes the charging procedure. Therefore, in comparison with a case where the charging procedure is executed assuming that printing is executed, a satisfactory charging procedure can be performed for the user. Therefore, according to the illustrative embodiment, the user can make use of a charged information providing service provided by the function server 10. Further, according to the above-described configuration, an information service provider can prevent malicious usage of the service and reliably collect charges.

In the MFP 30 according to the illustrative embodiment, when the up/down cursor keys are not operated, the top selection number is kept at "1" and the end selection number is kept at the maximum value (i.e., the latest reception number) of the reception number assigned to the reception unit information of the reception management information (S1133). Further, when the up/down cursor keys are not operated, the value of the parameter representing the selected amount of money which is contained in the charge command signal as the charged amount of money is set to the total amount of money. That is, by inputting a print command through the operation unit 32 when the amount of money displayed in the total amount of money field has reached the user's intended amount the selected amount of money is set to the total amount of money. Then, the printing operation only for the amount of money displayed in the total amount of money field is performed by the MFP 30.

According to the MFP 30 described above, even when the data receiving procedure task receives a series of print data from the function server 10, if the print command is input through the operation unit 32, the printing operation is executed without completion of the receiving procedure of the print data. Therefore, according to the MFP 30 above, images based on the print data provided by the function server 10 can be provided to the user of the MFP 30 quickly.

According to aspects of the invention, even when the data receiving procedure task receives a series of print data from the function server 10, if the reception completion command is input through the operation unit 32, the MFP 30 transmits the reception completion notification to the function server 10 (S880) so that the function server 10 stops transmitting the print data.

It should be noted that the image formation apparatus and image formation system according to aspects of the invention need not be limited to that described above as the illustrative embodiment, but can be modified in various ways.

For example, in the illustrative embodiment above, a charge is determined on a page basis, and the print data and the charge schedule information are transmitted from the function server 10 to the MFP 30 on a page basis. However, units other than a "page" may be employed instead.

If the charge for a page is set to a predetermined value, the charge schedule information may not be transmitted to the MFP 30. In such a case, for example, the charge on the page basis may be registered with the MFP 30, which may be configured such that the values of the parameter representing the total amount of money and the value of the parameter of the selection amount of money may be updated based on the registered information.

What is claimed is:

1. An image formation apparatus configured to communicate with a server apparatus, the server apparatus transmitting image data to the image formation apparatus, and executing a charging procedure to determine an amount of money to be charged in accordance with an amount of images to be formed and output, the image formation apparatus comprising:

- an image data receiving unit configured to receive a predetermined amount of image data transmitted from the server apparatus each time the image data is transmitted;
- an image output unit configured to output images;
- a display unit configured to display a total amount of money required to output the received predetermined amount of image data with the image output unit and an amount of money allowed to be charged, an amount of money to be charged being variable through a user operation, when the image data receiving unit receives the predetermined amount of image data, wherein the display unit is configured to display the total amount of money as the total amount of money to be charged prior to receiving a user operation to change the amount of money to be charged, and the image output unit outputs images in accordance with the display unit displaying the amount of money to be charged if the image output unit outputs the images based on the received image data;
- a display updating unit configured to update the total amount of money and the amount of money to be charged displayed on the display unit with a total amount of money required to output the received predetermined amount of image data and next received predetermined amount of image data with the image output unit, when the image data receiving unit receives the next predetermined amount of image data, prior to receiving a user operation to change the amount of money to be charged;

an input unit configured to receive an input command, which corresponds to a user input, and charge-allowed information, input by a user through the input unit, representing the amount of money which is allowed to be charged;

a charge-allowed information storage configured to store the charge-allowed information; and an output control unit configured to control the image output unit in accordance with the input command, the output control unit causing the image output unit to output images corresponding to the amount of money indicated by the charge-allowed information stored in the charge-allowed information storage in response to the input command, wherein the input unit is configured to receive the charge-allowed information when the amount of money allowed to be charged, displayed on the display unit, is changed by a user operation, wherein, when the image data receiving unit receives a new predetermined amount of image data, the display updating unit updates the total amount of money with a total amount of money including an amount of money required to output the new predetermined amount of image data, while the amount of money allowed to be charged, which has been changed through the input unit, is left unchanged, and wherein, when the image output unit has output the images corresponding to the amount of money indicated by the charge-allowed information, the output control unit causes the image output unit to stop outputting the images.

2. The image formation apparatus according to claim 1, further comprising a charge command signal transmitting unit configured to transmit a charge command signal to the server apparatus when an image is output, the charge command signal causing the server apparatus to execute the charging procedure.

3. The image formation apparatus according to claim 2, wherein the image output unit outputs an allowed amount of images in response to receiving an allowing signal from the server apparatus when the charging procedure determines the amount of money to be charged.

4. The image formation apparatus according to claim 1, wherein the image data receiving unit is configured to receive charge schedule information representing the amount of money to be charged together with the predetermined amount of image data from the server apparatus, and wherein the display unit is configured to display the total amount of money indicated by the charge schedule information for the received predetermined amount of image data from the server apparatus together with the received predetermined amount of image data.

5. The image formation apparatus according to claim 4, wherein the image output unit is configured to print an image based on the image data, and wherein the received predetermined amount is a page.

6. The image formation apparatus according to claim 1, wherein the image output unit and the image data receiving unit are configured to operate in parallel, and wherein when the image data receiving unit finishes receiving the image data corresponding to the amount of money indicated by the charge-allowed information from the server apparatus, the image formation apparatus transmits a reception completion notification to the server apparatus.

7. The image formation apparatus according to claim 1, wherein the output control unit controls an output amount by stopping the output of images when the image output unit has output an amount of images corresponding to the amount of money displayed by the display unit.

8. The image formation apparatus according to claim 1, wherein the input unit is configured to receive a stop transmission command, and wherein the output control unit is configured to instruct the server apparatus to stop transmitting the image data in accordance with the stop transmission command.

9. The image formation apparatus according to claim 1, wherein while the image output unit is outputting all the image data received in accordance with the change of the charge-allowed information, and after the image output unit has completed outputting the image data, the display updating unit updates the total amount of money and the amount of money allowed to be charged with a total amount of money including an amount of money required to output image data which has not been output and the amount of money allowed to be charged, and the display unit displays the updated total amount of money and the amount of money allowed to be charged.

10. The image formation apparatus according to claim 1, wherein when the input unit receives a start outputting command input by the user, prior to the image data receiving unit receiving all the image data and after the image data receiving unit has received the predetermined amount of image data, the image output unit outputs images corresponding to the amount of money allowed to be charged displayed on the display unit, and the display updating unit does not update the amount of money allowed to be charged displayed on the display unit when the input unit receives the start outputting command with an amount of money allowed to be charged based on the received image data, and when the image data receiving unit receives a next predetermined amount of image data after the image output unit has started outputting images.

11. An image formation system, comprising:

an image formation apparatus configured to output images in accordance with image data input externally; and a server apparatus including an image data transmitting unit configured to transmit image data to the image formation apparatus; and a charge processing unit configured to execute a charging procedure to determine an amount of money to be charged in accordance with an amount of images formed and output by the image formation apparatus, wherein the image formation apparatus includes:

an image data receiving unit configured to receive a predetermined amount of image data transmitted from the server apparatus each time the image data is transmitted;

an image output unit configured to output images;

a display unit configured to display a total amount of money required to output the received predetermined amount of image data with the image output unit and an amount of money allowed to be charged, an amount of money to be charged being variable through a user operation, when the image data receiving unit receives the predetermined amount of image data, wherein the display unit is configured to display the total amount of money as the total amount of money to be charged prior to receiving a user operation to change the amount of money to be charged, and the image output unit outputs images in accordance with the display unit displaying the amount of money to be charged if the image output unit outputs the images based on the received image data;

a display updating unit configured to update the total amount of money and the amount of money to be charged displayed on the display unit with a total amount of money required to output the received predetermined amount of image data and next received predetermined amount of image data with the image output unit, when the image data receiving unit receives the next predetermined amount of image data, prior to receiving a user operation to change the amount of money to be charged;

an input unit configured to receive an input command, which corresponds to a user input, and charge-allowed information, input by a user through the input unit, representing the amount of money which is allowed to be charged;

a charge-allowed information storage configured to store the charge-allowed information; and an output control unit configured to control an amount of images to be output by the image output unit in accordance with the input command, the output control unit causing the image output unit to output images corresponding to the amount of money indicated by the charge-allowed information stored in the charge-allowed information storage in response to the input command, wherein the input unit is configured to receive the charge-allowed information when the amount of money allowed to be charged, displayed on the display unit, is changed by a user operation, wherein, when the image data receiving unit receives a new predetermined amount of image data, the display updating unit updates the total amount of money with a total amount of money including an amount of money required to output the new predetermined amount of image data, while the amount of money allowed to be charged, which has been changed through the input unit, is left unchanged, and wherein, when the image output unit has output the images corresponding to the amount of money indicated by the charge-allowed information, the output control unit causes the image output unit to stop outputting the images.

12. A non-transitory computer-readable medium comprising computer readable instructions stored thereon, said instructions cause a computer system to function as an image formation apparatus which is configured to communicate with a server apparatus, the server apparatus transmitting image data to the image formation apparatus, and executing a charging procedure to determine an amount of money to be charged in accordance with an amount of images to be formed and output by the image formation apparatus, the computer readable instructions causing the computer system to perform the steps of:

receiving a predetermined amount of image data transmitted from the server apparatus each time the image data is transmitted;

outputting images in accordance with the received image data;

displaying a total amount of money required to output the received predetermined amount of image data and an amount of money allowed to be charged, an amount of money to be charged is variable through a user operation, when receiving the predetermined amount of image data, and wherein the total amount of money is displayed as the total amount of money to be charged prior to receiving a user operation to change the amount of money to be charged, and the step of outputting images is performed in accordance with the step of displaying the amount of money to be charged if the images based on the received image data are output;

updating the total amount of money displayed and the amount of money to be charged with a total amount of money required to output the received predetermined amount of image data and next received predetermined amount of image data, when receiving the next predetermined amount of image data, prior to receiving a user operation to change the amount of money to be charged;

receiving an input command, which corresponds to a user input, and charge-allowed information, input by a user, representing the amount of money which is allowed to be charged;

storing the charge-allowed information; and controlling an amount of images to be output in accordance with the input command, the step of controlling causing the step of outputting to output images corresponding to the amount of money indicated by the charge-allowed information, wherein the charge-allowed information is received by the step of receiving the input command when the amount of money allowed to be charged is displayed, is changed by a user operation, wherein, when a new predetermined amount of image data is received in the step of receiving the predetermined amount of image data, the step of updating updates the total amount of money with a total amount of money including an amount of money required to output the new predetermined amount of image data, while the amount of money allowed to be charged, which has been changed, is left unchanged, and wherein the step of controlling causes the step of outputting to stop outputting the images when the images corresponding to the amount of money indicated by the charge-allowed information have been output.

13. The non-transitory computer readable medium according to claim 12, wherein the steps of outputting the images and receiving the predetermined amount of image data are configured to be performed in parallel, and wherein when the step of receiving the predetermined amount of image data finishes receiving the image data corresponding to the amount of money indicated by the charge-allowed information from the server apparatus, the computer readable instructions cause the computer system to transmit a reception completion notification to the server apparatus.

14. The non-transitory computer readable medium according to claim 12, wherein the step of controlling causes the step of outputting to stop outputting the images when the amount of images corresponding to the amount of money has been output.

15. The non-transitory computer-readable medium having computer readable instructions according to claim 12, wherein the computer readable instructions further cause the computer system to perform the step of:

receiving a stop transmission command, and instructing the server apparatus to stop transmitting the image data in accordance with the stop transmission command.

* * * * *